(12) United States Patent
Cheng

(10) Patent No.: US 8,059,417 B2
(45) Date of Patent: Nov. 15, 2011

(54) SWITCH MODULE

(75) Inventor: Ching-Wei Cheng, Keelung (TW)

(73) Assignee: Action Star Enterprise, Co. Ltd., Taipei (TW)

( * ) Notice: Subject to any disclaimer, the term of this patent is extended or adjusted under 35 U.S.C. 154(b) by 462 days.

(21) Appl. No.: 12/342,244

(22) Filed: Dec. 23, 2008

(65) Prior Publication Data

US 2010/0157551 A1 Jun. 24, 2010

(51) Int. Cl.
*H05K 5/00* (2006.01)
(52) U.S. Cl. ............... 361/752; 710/65; 439/188
(58) Field of Classification Search .......... 361/752, 361/790; 439/188
See application file for complete search history.

(56) References Cited

U.S. PATENT DOCUMENTS

| | | | |
|---|---|---|---|
| 6,927,336 B2 * | 8/2005 | Huang | 174/541 |
| 7,035,112 B2 * | 4/2006 | Chen | 361/752 |
| 7,281,067 B2 * | 10/2007 | Chen | 710/62 |
| 7,283,375 B2 * | 10/2007 | Chen | 361/797 |
| 7,502,230 B2 * | 3/2009 | Chang et al. | 361/752 |
| 7,508,678 B2 * | 3/2009 | Chen | 361/752 |
| 7,542,299 B2 * | 6/2009 | Chen | 361/752 |
| 7,783,801 B2 * | 8/2010 | Lin | 710/65 |
| 2001/0023141 A1 * | 9/2001 | Chang | 439/76.1 |
| 2004/0257761 A1 * | 12/2004 | Park | 361/686 |
| 2007/0128920 A1 * | 6/2007 | Brown et al. | 439/440 |

FOREIGN PATENT DOCUMENTS

JP 2010152896 A * 7/2010

* cited by examiner

*Primary Examiner* — Lisa Lea Edmonds
(74) *Attorney, Agent, or Firm* — Roger H. Chu

(57) ABSTRACT

A switch module comprising: a first body; a first switching circuit contained within the first body; a first set of connector ports electrically coupled to the first switching circuit; a second body; a second switching circuit contained within the second body; a second set of connector port electrically coupled to the second switching circuit; a plurality of first cables fixedly attached to and extending from the first body, each cable in the plurality of first cables having an USB connector plug; and a plurality of second cables fixedly attached to and extending from the second body, each cable in the plurality of second cables having a video connector plug; wherein the first switching circuit and the second switching circuit switch to connect each of the first set of connector ports to one of the plurality of first cables and the second set of connector port to one of the plurality of second cables, respectively.

14 Claims, 7 Drawing Sheets

SWITCH MODULE

BACKGROUND OF THE INVENTION (a) Field of the Invention

The present invention relates to a KVM (keyboard, video and mouse) switch for interconnecting at least two computer hosts each having user interface devices, including a keyboard, a video display unit, and a cursor control device or mouse, allowing a user to access any one of the computer hosts from a single terminal, and more particularly, to a switch module with low manufacture cost for enabling a single user to control multiple computer hosts at a single terminal.

(b) Description of the Prior Art

There exist devices for interconnecting a single computer to multiple computers. For example, a keyboard/video/mouse (KVM) switch is a device that is generally connected to multiple computers in order to enable a single keyboard, video monitor and mouse to control each of the connected computers. In this way, a user may have access to multiple computers without having to invest in corresponding keyboards, monitors, and mice for each of the computers. When the user accesses a computer connected to the KVM switch, video signals are routed from the computer, processed, and displayed on the single video monitor.

U.S. Pat. No. 7,035,112, as shown in FIG. 1, the contents of which are hereby incorporated by reference, discloses an original KVM switch 10 comprising: a body 40; a switching circuit contained within the body; a set of connector ports electrically coupled to the switching circuit; and, a plurality of cables 11 fixedly attached to and extending from the body 40, each cable in the plurality of cables 11 having a plurality of connector plugs 30, wherein each connector plug 31, 32, 33 in the plurality of connector plugs 30 for one of the cables in the plurality of cables 11 are matched a respective connector plug in another one of the cables in the plurality of cables 11, and wherein the switching circuit switches to connect each of the set of connector ports to one of the plurality of cables 11.

For manufacture cost toward a KVM switch speaking, cables with plurality of connector plugs (keyboard plug, video plug and mouse plug) weigh 70% of KVM total manufacture cost. The automatic switch in '112 patent with two cables with plurality of connector plugs will increase the manufacture cost. It is not benefit for manufacturing.

It is desirable, therefore, to provide a KVM switch that has an intuitive user interface to allow for easy interaction with one or more computers connected to the KVM switch without increasing the manufacture cost.

SUMMARY OF THE INVENTION

It is an object of the present invention to provide a switch module for enabling a single user to control one or more host computers on a computing device without increasing the manufacture cost.

According to a preferred embodiment, the present invention provides a switch module comprising: a first body; a first switching circuit contained within the first body; a first set of connector ports electrically coupled to the first switching circuit; a second body; a second switching circuit contained within the second body; a second set of connector port electrically coupled to the second switching circuit; a plurality of first cables fixedly attached to and extending from the first body, each cable in the plurality of first cables having an USB connector plug; and a plurality of second cables fixedly attached to and extending from the second body, each cable in the plurality of second cables having a video connector plug; wherein the first switching circuit and the second switching circuit switch to connect each of the first set of connector ports to one of the plurality of first cables and the second set of connector port to one of the plurality of second cables, respectively.

According to another embodiment, the present invention provides a switch module comprising: a first body with a first video connector plug and a first cable for electrically connecting to a first computer host; a first switching circuit contained within the first body; a first set of connector ports electrically coupled to the first switching circuit; a second body with a second video connector plug and a second cable for electrically connecting to a second computer host; a second switching circuit contained within the second body; and a second set of connector port electrically coupled to the second switching circuit; and a primary cable electrically connected between the first body and the second body; wherein the first switching circuit switches to connect each of the first set of connector ports to one of the first and second cable and the second switching circuit switches to connect the second set of connector port to one of the first and second video connector plug.

The details and technology of the present invention are described below with reference to the accompanying drawings:

DETAILED DESCRIPTION OF THE PREFERRED EMBODIMENTS

The present invention relates generally to a switch module for enable a single user to control plurality of computers with a keyboard, monitor and cursor control device. There are many products for converting keyboard and cursor control device signals to USB signals. The concept is used in the switch module of present invention.

Figure 1:
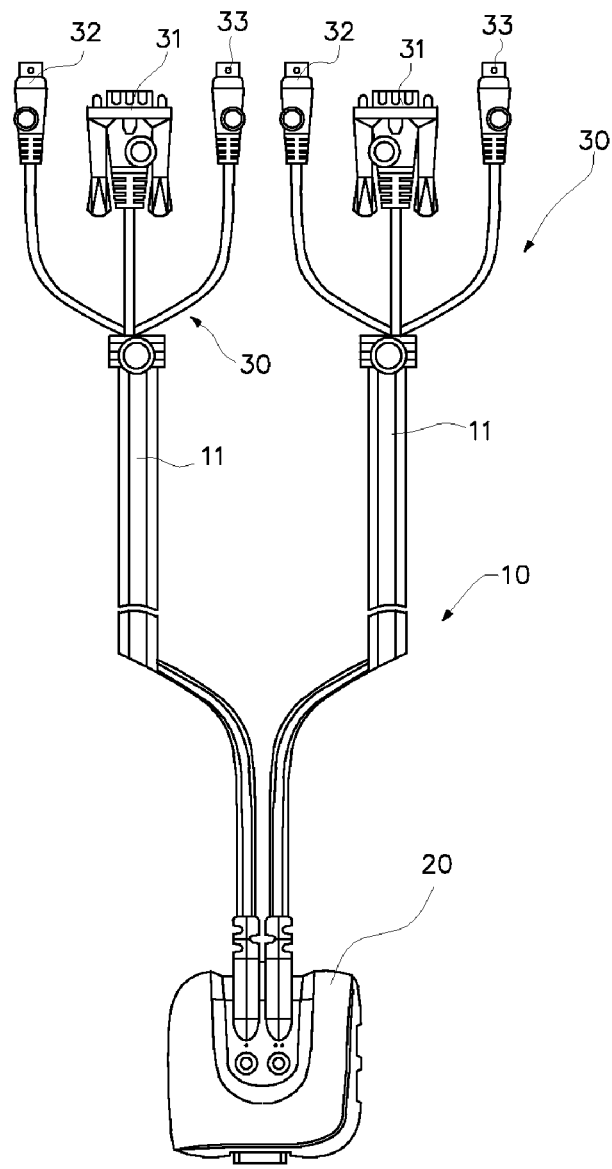
FIG. 1 is a block diagram of original KVM switch.
Figure 2:
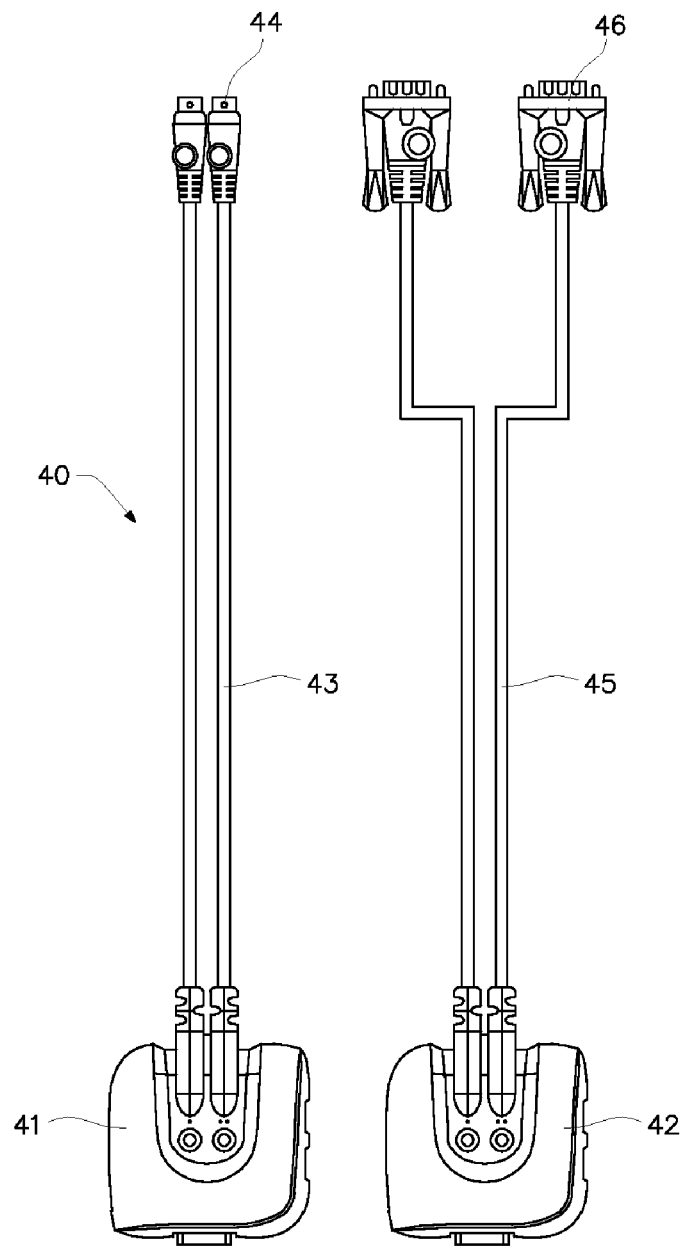
FIG. 2 is a diagram showing an exemplary switch module according to the invention.

As shown in FIG. 2, the switch module 40 comprises a first body 41, a second body 42, a plurality of first cables 43 each having an USB connector plug 44 and a plurality of second cables 45 each having a video connector plug 46. The plurality of first cables 43 fixedly attached to and extending from the first body 41 and the plurality of second cables 45 fixedly attached to and extending from the second body 42. A first switching circuit contained within the first body 41 electrically coupled to a first set of connector ports switches to connect each of the first set of connector ports to one of the plurality of first cables 43. A second switching circuit contained within the second body 42 electrically coupled to a second set of connector port switches to connect the second set of connector port to one of the plurality of second cables 45.

The first set of connector ports are electrically connected to external control devices such as a keyboard and a cursor control device. The second set of connector port is electrically connected to external display device such as a LCD monitor. The plurality of first cables 43 each having an USB connector plug 44 are electrically connected to corresponding computer hosts and the plurality of second cables 45 each having a video connector plug 46 are also electrically connected to the corresponding computer hosts. Thus, one of the computer hosts is electrically connected to the external control devices such as a keyboard and a cursor control device and external display device such as a LCD monitor through the first switching circuit within the first body 41 and the second switching circuit within the second body 42, respectively.

Because the first set of connector ports are electrically connected to external control devices such as a keyboard and a cursor control device and electrically connected to one of the plurality of the first cables 43 through the first switching circuit within the first body 41, the keyboard and mouse control signals controlled by a user can be transmitted to one of the computer hosts through corresponding of the plurality of first cables 43. According to the keyboard and mouse control signals can be transmitted by one cable having an USB connector plug 44, the amount of connector plug 44 of the first cables 43 can be reduced. Although adding the second body 42 may increase about 5% of the total manufacture cost, but all cables with one connector plug may save 35% of the total manufacture cost. Thus, 30% of the total manufacture cost of the switch module 40 can be reduced.

In the same way, the second set of connector port is electrically connected to external display device such as a LCD monitor and electrically connected to one of the plurality of the second cables 45 through the second switching circuit within the second body 42. The video signals output by one of the computer hosts can be transmitted to the external display device through corresponding of the plurality of second cables 45.

As known, the USB connector plug 44 can be any type connector plug which can transmit keyboard and mouse signals in parallel, for example, IEEE 1394. Also, the video connector plug 46 can be any type connector plug which can transmit video signals, for example, HDMI, DVI, D-SUB, etc.

Figure 3:
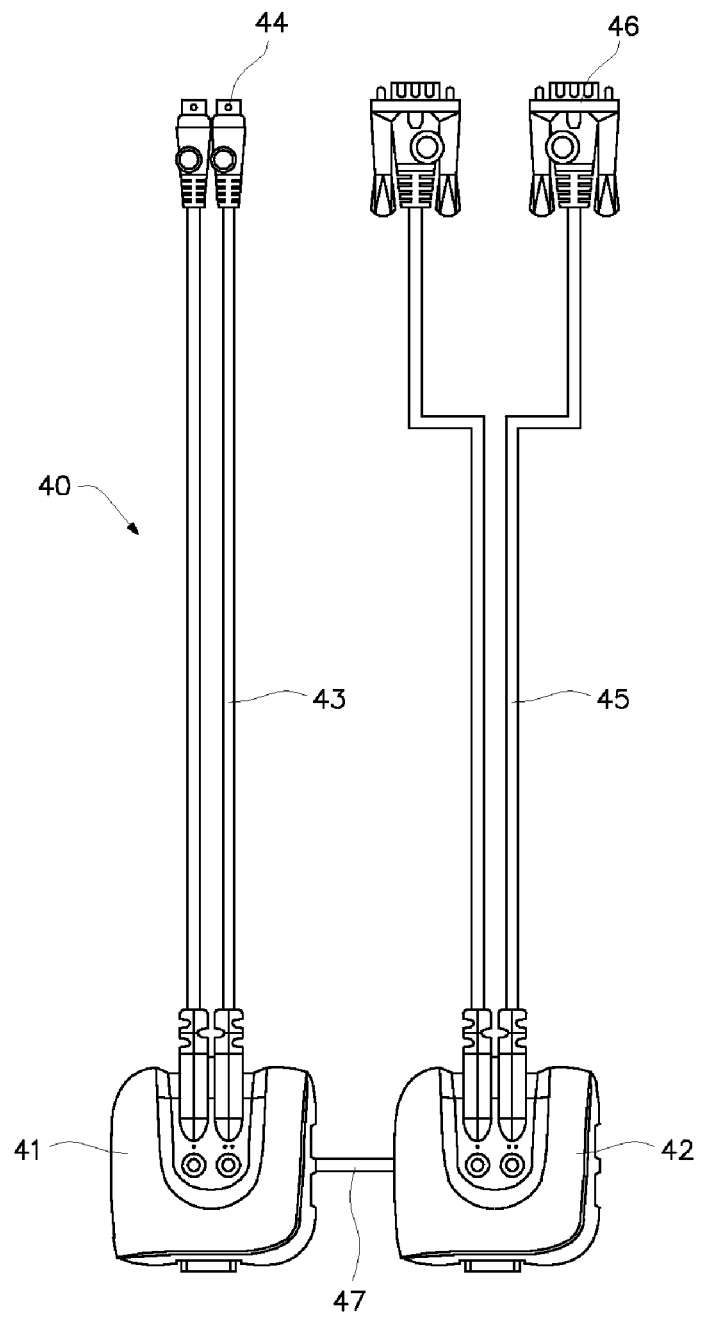
FIG. 3 is a diagram showing another exemplary switch module according to the invention.

If the user wants to switch the switch module 40 in FIG. 2, the user has to switch the first switching circuit within the first body 41 and the second switching circuit within the second body 42 for switching the control of one computer host to another. As shown in FIG. 3, the switch module 40 comprises a first body 41, a second body 42 with a third cable 47 for electrically connecting to the first body, a plurality of first cables 43 each having an USB connector plug 44 and a plurality of second cables 45 each having a video connector plug 46. The user can switch the first switching circuit within the first body 41 to control the computer host from one to another, and the second switching circuit within the second body 42 can be switched to display video signals of the computer host from one to another automatically thorough the third cable 47. Accordingly, the second switching circuit within the second body 42 switches following the switching of the first switching circuit within the first body 41 through the third cable 47. Furthermore, the third cable 47 combines the first body 41 and the second body 42 together for avoiding one of them disappeared.

Figure 4:
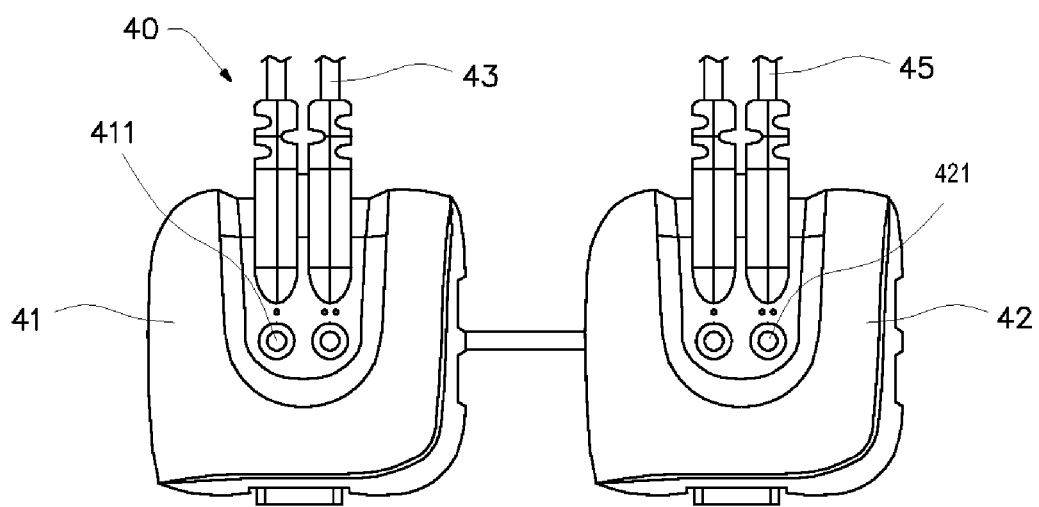
FIG. 4 is a diagram showing further another exemplary switch module according to the invention.

As shown in FIG. 4, there exists a first indicating unit 411 on the first body 41 to indicate which one of the first cables 43 being electrically connecting to the first switching circuit within the first body 41. In the same way, there exists a second indicating unit 421 on the second body 42 to indicate which one of the second cables 45 being electrically connecting to the second switching circuit within the second body 41. The first indicating unit 411 and second indicating unit 421 are a set of LEDs (light emitting diodes) or a FPD (flat panel display). Thus, the user can understand which one of the computer hosts corresponding to the indicated first cable and second cable being controlled.

Figure 5:
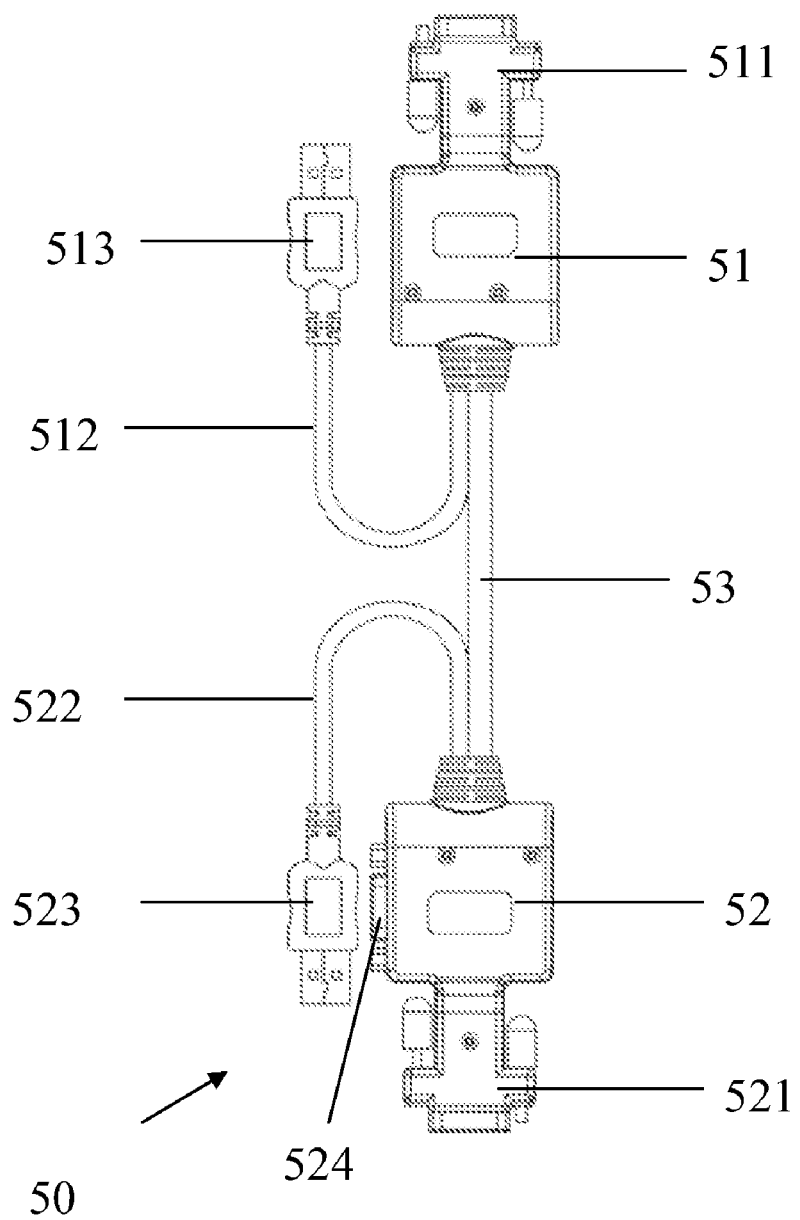
FIG. 5 is a diagram showing another yet exemplary switch module according to the invention.
Figure 6:
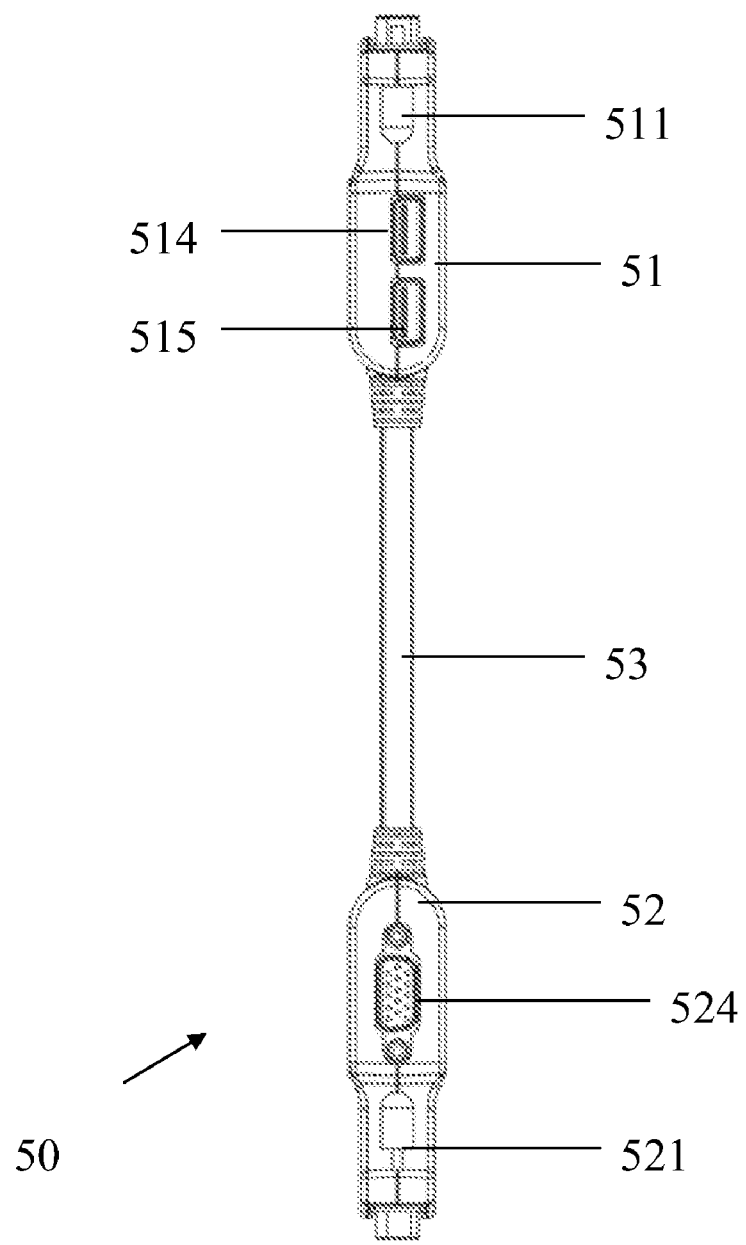
FIG. 6 is a side view of FIG. 5.

Referring to FIG. 5 and FIG. 6, the switch module 50 comprises a first body 51, a second body 52 and a primary cable 53 electrically connected between the first body 51 and the second body 52. The first body 51 includes a first video connector plug 511 and a first cable 512 with an USB connector plug 513 for electrically connecting to a first computer host. A first switching circuit contained within the first body 51 is electrically coupled to a first set of connector ports 514, 515. The first set of connector ports 514, 515 are USB, PS2 or IEEE1394 ports for connecting to a set of external keyboard and cursor control device. The second body 52 includes a second video connector plug 521 and a second cable 522 with an USB connector plug 523 for electrically connecting to a second computer host. A second switching circuit contained within the second body 52 is electrically coupled to a second set of connector port 524. The second set of connector port 524 is a video connector plug such as VGA, HDMI, DVI or display port. The first switching circuit switches to connect each of the first set of connector ports 514, 515 to one of the first and second cable 512, 522 and the second switching circuit switches to connect the second set of connector port 524 to one of the first and second video connector plug 511, 521.

Because the first set of connector ports 514, 515 are electrically connected to external control devices such as a keyboard and a cursor control device and electrically connected to the first cable 512 or the second cable 522 through the primary cable 53 by the first switching circuit within the first body 51, the keyboard and mouse control signals controlled by a user can be transmitted to one of the first or second computer host through the first body 51, second body 52 and the primary cable 53. Moreover, the second set of connector port 524 is electrically connected to a display device such as a LCD monitor and electrically connected to the first video connector plug 511 through the primary cable 53 or second video connector plug 521 by the second switching circuit within the second body 52, the video signals of the first and second computer host can be transmitted to one of the video connector plug 511 or the second video connector plug 521 through the first body 51, the second body 52 and the primary cable 53.

Figure 7:
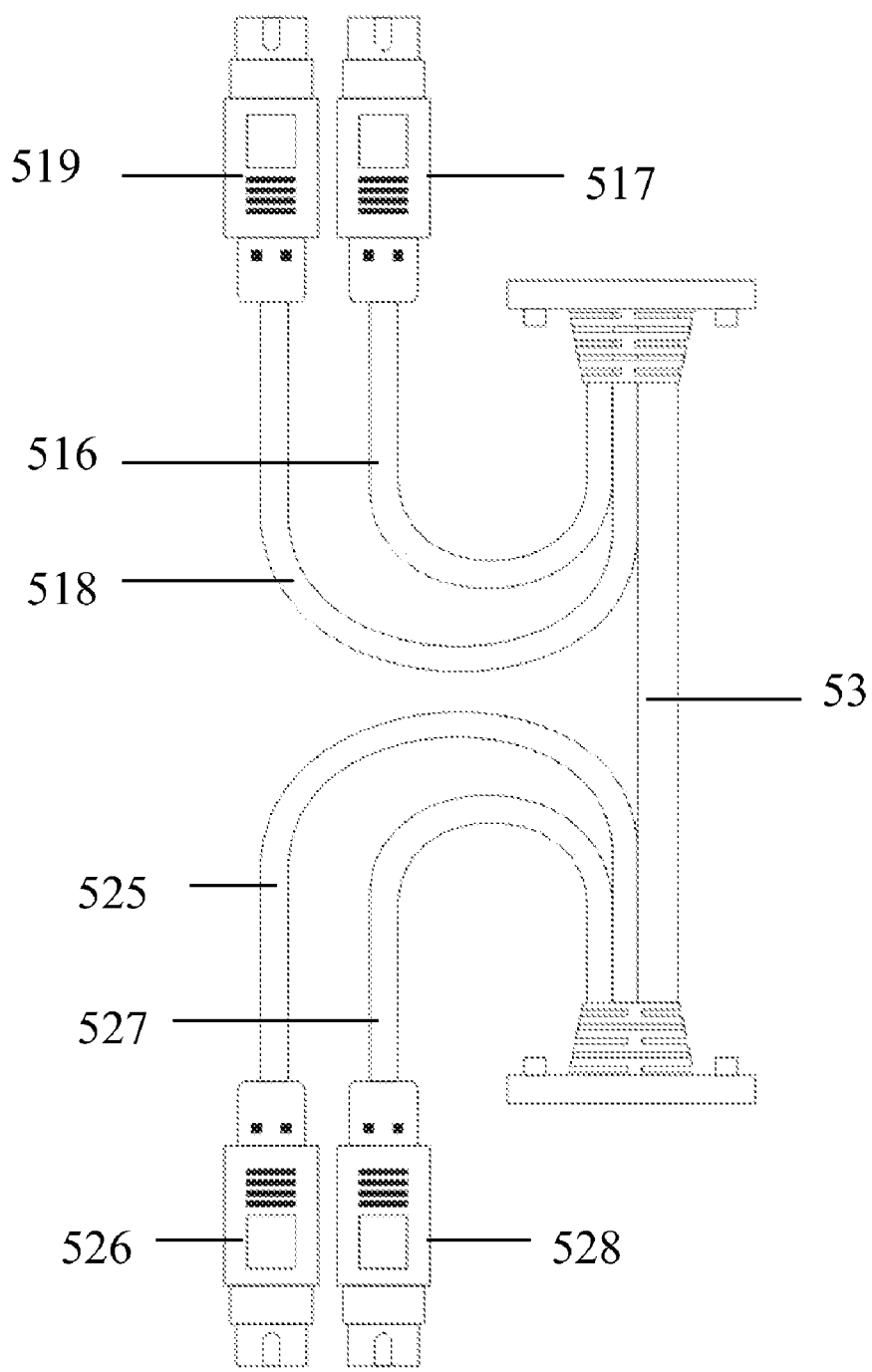
FIG. 7 is further another yet exemplary switch module according to the invention.

Referring to FIG. 7, the switch module comprises a first body, a second body and a primary cable 53 electrically connected between the first body and the second body. The first body includes a first video connector plug and a first set cables 516, 518 each having a PS2 connector plug 517, 519 for electrically connecting to a first computer host. The second body includes a second video connector plug and a second set cables 525, 527 each having a PS2 connector plug 526, 528 for electrically connecting to a second computer host.

According to the keyboard and mouse control signals and the video signals can be transmitted by the primary cable between the first body and the second body, the amount of used cables can be reduced. Although adding the second body may increase about 5% of the total manufacture cost, but only one primary cable connected between the first and second body may save 35% of the total manufacture cost. Thus, 30% of the total manufacture cost of the switch module can be reduced.

It should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

I claim:

1. A switch module comprising:
   a first body;
   a first switching circuit contained within the first body;
   a first set of connector ports electrically coupled to the first switching circuit; a second body;
   a second switching circuit contained within the second body;
   a second set of connector port electrically coupled to the second switching circuit;
   a plurality of first cables fixedly attached to and extending from the first body, each cable in the plurality of first cables having an USB connector plug; and
   a plurality of second cables fixedly attached to and extending from the second body, each cable in the plurality of second cables having a video connector plug;
   wherein the first switching circuit and the second switching circuit switch to connect each of the first set of connector ports to one of the plurality of first cables and the second set of connector port to one of the plurality of second cables, respectively.

2. The switch module as defined in claim 1, further comprises a third cable electrically connected between the first body and the second body for rendering the second switching circuit within the second body switching following the first switching circuit within the first body.

3. The switch module as defined in claim 1 further comprises a first indicating unit disposed on the first body for indicating which one of the first cables being electrically connecting to the first switching circuit within the first body.

4. The switch module as defined in claim 3, wherein the first indicating unit is a set of LEDs or a FPD.

5. The switch module as defined in claim 1 further comprises a second indicating unit disposed on the second body for indicating which one of the second cables being electrically connecting to the second switching circuit within the second body.

6. The switch module as defined in claim 5, wherein the second indicating unit is a set of LEDs or a FPD.

7. A switch module comprising:
   a first body with a first video connector plug and a first cable for electrically connecting to a first computer host;
   a first switching circuit contained within the first body;
   a first set of connector ports electrically coupled to the first switching circuit;
   a second body with a second video connector plug and a second cable for electrically connecting to a second computer host;
   a second switching circuit contained within the second body; and a second set of connector port electrically coupled to the second switching circuit; and
   a primary cable electrically connected between the first body and the second body;
   wherein the first switching circuit switches to connect each of the first set of connector ports to one of the first and second cable and the second switching circuit switches to connect the second set of connector port to one of the first and second video connector plug.

8. The switch module as defined in claim 7, wherein the first set of connector ports are USB, PS2 or IEEE1394 ports.

9. The switch module as defined in claim 7, wherein the first cable has an USB connector plug.

10. The switch module as defined in claim 7, wherein the second cable has an USB connector plug.

11. A switch module comprising:
    a first body with a first video connector plug and a first set cables for electrically connecting to a first computer host;
    a first switching circuit contained within the first body;
    a first set of connector ports electrically coupled to the first switching circuit;
    a second body with a second video connector plug and a second set cables for electrically connecting to a second computer host;
    a second switching circuit contained within the second body; and a second set of connector port electrically coupled to the second switching circuit;
    a primary cable electrically connected between the first body and the second body;
    wherein the first switching circuit switches to connect each of the first set of connector ports to one of the first set and second set cables and the second switching circuit switches to connect the second set of connector port to one of the first and second video connector plug.

12. The switch module as defined in claim 11, wherein the first set of connector ports are USB, PS2 or IEEE1394 ports.

13. The switch module as defined in claim 11, wherein the first set cables each has a PS2 connector plug.

14. The switch module as defined in claim 11, wherein the second cables each has a PS2 connector plug.

* * * * *